US010795985B2

United States Patent
Attfield et al.

(10) Patent No.: US 10,795,985 B2
(45) Date of Patent: Oct. 6, 2020

(54) APPLICATIONS OF SECURED MEMORY AREAS AND SECURE ENVIRONMENTS IN POLICY-BASED ACCESS CONTROL SYSTEMS FOR MOBILE COMPUTING DEVICES

(71) Applicant: Sequitur Labs Inc., Issaquah, WA (US)

(72) Inventors: Philip Attfield, Fall City, WA (US); Daniel Schaffner, Seattle, WA (US); Michael Thomas Hendrick, Renton, WA (US)

(73) Assignee: Sequitur Labs Inc., Issaquah, WA (US)

( * ) Notice: Subject to any disclaimer, the term of this patent is extended or adjusted under 35 U.S.C. 154(b) by 0 days.

(21) Appl. No.: 15/306,066

(22) PCT Filed: Apr. 24, 2015

(86) PCT No.: PCT/US2015/027561
§ 371 (c)(1),
(2) Date: Oct. 21, 2016

(87) PCT Pub. No.: WO2016/010602
PCT Pub. Date: Jan. 21, 2016

(65) Prior Publication Data
US 2017/0048714 A1    Feb. 16, 2017

Related U.S. Application Data

(60) Provisional application No. 61/987,053, filed on May 1, 2014.

(51) Int. Cl.
*H04W 12/08* (2009.01)
*G06F 21/44* (2013.01)
(Continued)

(52) U.S. Cl.
CPC .............. *G06F 21/44* (2013.01); *G06F 21/57* (2013.01); *G06F 21/62* (2013.01);
(Continued)

(58) Field of Classification Search
CPC ............................. H04W 12/08; G06F 21/57
See application file for complete search history.

(56) References Cited

U.S. PATENT DOCUMENTS 5,881,225 A   3/1999 Worth
7,140,035 B1  11/2006 Karch
(Continued)

FOREIGN PATENT DOCUMENTS

WO   PCT/US14/70897      12/2014
WO   WO 2015/026389       2/2015
(Continued)

OTHER PUBLICATIONS

NPL Search (Google Scholar) (Year: 2020).*
(Continued)

*Primary Examiner* — Mahfuzur Rahman
*Assistant Examiner* — Richard W Cruz-Franqui
(74) *Attorney, Agent, or Firm* — JRG Attorneys at Law

(57) ABSTRACT

Systems and methods are described for utilizing a secure environment on a mobile computing device for applying policy-based decision management in response to access requests from untrusted areas. A policy decision processor (PDP) within the secure environment provides a policy decision in response to an access query. A decision cache within the secure environment can be used to store policy decisions for faster resolution of access requests. Policy enforcement points (PEPs) are placed between external devices that are trying to access the device and the secured environment, where the PEPs are used to enforce the policy-based decision, and can be located either inside or outside (Continued)

the secure environment. Decision certificates can be formulated using validity information and timestamps, and used for validation policy certificates. Memory in non-secure areas can also be marked (colored) for use in performing trusted operations in order to optimize system resource usage.

21 Claims, 13 Drawing Sheets

(51) Int. Cl.
*G06F 21/57* (2013.01)
*G06F 21/62* (2013.01)
*H04L 29/06* (2006.01)

(52) U.S. Cl.
CPC ......... *H04L 63/0853* (2013.01); *H04L 63/20* (2013.01); *H04W 12/08* (2013.01)

(56) References Cited

U.S. PATENT DOCUMENTS

| | | | |
|---|---|---|---|
| 7,246,233 | B2 | 7/2007 | Brabson et al. |
| 7,640,429 | B2 | 12/2009 | Huang et al. |
| 8,127,982 | B1 | 3/2012 | Casey et al. |
| 8,285,249 | B2 | 10/2012 | Baker et al. |
| 8,463,819 | B2 | 6/2013 | Shashikumar et al. |
| 8,468,586 | B2 | 6/2013 | Koottayi et al. |
| 9,066,230 | B1* | 6/2015 | Paczkowski ......... H04W 12/06 |
| 9,135,437 | B1* | 9/2015 | Allen ..................... G06F 21/53 |
| 2004/0098454 | A1* | 5/2004 | Trapp ..................... H04L 63/08 709/204 |
| 2005/0193196 | A1 | 9/2005 | Huang et al. |
| 2006/0184804 | A1* | 8/2006 | Varma ................. G06F 12/1425 713/193 |
| 2006/0212574 | A1* | 9/2006 | Maes .................... H04L 63/102 709/226 |
| 2007/0006282 | A1* | 1/2007 | Durham ................ H04L 9/3234 726/2 |
| 2007/0226795 | A1* | 9/2007 | Conti .................... G06F 21/554 726/22 |
| 2007/0234402 | A1* | 10/2007 | Khosravi ............ H04L 63/0227 726/2 |
| 2008/0016550 | A1* | 1/2008 | McAlister ............... H04L 63/20 726/1 |
| 2008/0184336 | A1* | 7/2008 | Sarukkai ............. G06F 21/6218 726/1 |
| 2009/0089125 | A1 | 4/2009 | Sultan |
| 2009/0165083 | A1* | 6/2009 | McLean ................ G06F 21/725 726/1 |
| 2009/0193503 | A1* | 7/2009 | Shevehenko ....... H04L 63/0272 726/4 |
| 2009/0204785 | A1 | 8/2009 | Yates, Jr. et al. |
| 2009/0205016 | A1 | 8/2009 | Milas |
| 2010/0250370 | A1 | 9/2010 | Jones et al. |
| 2011/0191579 | A1* | 8/2011 | Xiao ..................... H04L 9/3247 713/156 |
| 2012/0005718 | A1* | 1/2012 | Xiao ....................... H04L 63/20 726/1 |
| 2012/0216012 | A1 | 8/2012 | Vorbach et al. |
| 2012/0270523 | A1* | 10/2012 | Laudermilch ......... H04W 12/08 455/411 |
| 2013/0029653 | A1 | 1/2013 | Baker et al. |
| 2013/0111211 | A1* | 5/2013 | Winslow ................ G06F 21/57 713/171 |
| 2013/0145429 | A1* | 6/2013 | Mendel .................. G06F 21/00 726/4 |
| 2013/0198838 | A1* | 8/2013 | Schmidt ............... H04L 9/3265 726/22 |
| 2013/0219176 | A1* | 8/2013 | Akella .................. G06F 16/185 713/165 |
| 2013/0253942 | A1 | 9/2013 | Liu et al. |
| 2013/0275760 | A1* | 10/2013 | Hawkes .............. H04L 63/0823 713/175 |
| 2013/0298664 | A1 | 11/2013 | Gillette, II |
| 2014/0115659 | A1 | 4/2014 | Attfield et al. |
| 2014/0189777 | A1* | 7/2014 | Viswanathan ........ H04L 63/105 726/1 |
| 2015/0074746 | A1* | 3/2015 | Kohno .................... G06F 21/34 726/1 |
| 2015/0207625 | A1* | 7/2015 | Sathaye ............. G06F 21/6245 726/26 |
| 2015/0350254 | A1 | 12/2015 | Hendrick et al. |
| 2017/0048714 | A1* | 2/2017 | Attfield ................... G06F 21/57 |

FOREIGN PATENT DOCUMENTS

| | | |
|---|---|---|
| WO | PCT/US15/24932 | 4/2015 |
| WO | PCT/US15/27561 | 4/2015 |

OTHER PUBLICATIONS

"Computer Architecture: A Quantitative Approach", Hennessy J. and Patterson, D., 5th Ed. Morgan Kaufman (2011).
"Computer Networks", Tanenbaum, A. Andrew and Wetherall, D., 5th Ed. Prentice Hall (2010).
"Prolog Programming: A First Course", Brna, P. (Mar. 5, 2001). Retrieved from <http://homepages.int.ed.ac.uk/obrna/prologbook/> on Mar. 16, 2013.
NFC Forum (2007), "Near Field Communication and the NFC Forum: The Keys to Truly Interoperable Communications" (PDF), http://www.nfc-forum.org, retrieved Oct. 30, 2012.
Landt, Jerry (2001), "Shrouds of Time: The history of RFID", AIM, Inc, pp. 5-7.
Bluetooth Special Interest Group website, "A Look at the Basics of Bluetooth Wireless Technology", http://www.bluetooth.com/Pages/Basics.aspx, retrieved Oct. 29, 2012.
See e.g. H. Schildt, C++—The Complete Reference, 2nd edition, pp. 67-70 McGraw Hill, 1995, ISBN 0-07-882123-1.
K. Ashton, That 'Internet of Things' Thing, RFID Journal Jun. 22, 2009 (available online as of Oct. 20, 2013 at http://www.rfidjournal.com/articles/view?4986).
T. White, Hadoop—The Definitive Guide, O'Reilly, 2009, ISBN 978-0-596-52197-4.
Nakamoto, Satoshi. "Bitcoin: A peer-to-peer electronic cash system." Consulted Jan. 2012 (2008): 28. Obtained from http://www.cryptovest.co.uk/resources/Bitcoin%20paper%20Original.pdf on Apr. 6, 2015.
Bitcoin, Inc., "What are multi-signature transactions?", Obtained from http://bitcoin.stackexchange.com/questions/3718/what-are-multi-signature-transactions on Apr. 6, 2015.
Verilog, http://www.verilog.com/, accessed May 12, 2014.
IEEE P1076 Working Group, http://www.eda.org/twiki/bin/view.cgi/P1076, accessed May 12, 2014.
University of British Columbia, Department of Electrical and Computer Engineering, http://www.ece.ubc.ca/~edc/379.an99/lectures/lec13.pdf, accessed May 12, 2014.
L. Woods, Zs. Istvan, G. Alonso. Ibex (2014) "An Intelligent Storage Engine with Support for Advanced SQL Off-loading." VLDB 2014, Hangzhou, China, Sep. 2014.

* cited by examiner

APPLICATIONS OF SECURED MEMORY AREAS AND SECURE ENVIRONMENTS IN POLICY-BASED ACCESS CONTROL SYSTEMS FOR MOBILE COMPUTING DEVICES

CROSS-REFERENCE TO RELATED APPLICATIONS

This application is entitled to the benefit of, and claims priority to U.S. Provisional Application 61/987,053, filed on May 1, 2014, which is included by reference as if fully set forth herein. The application also incorporates by reference U.S. Utility application Ser. No. 13/945,677, filed on Jul. 18, 2013, as if fully set forth herein.

COPYRIGHT STATEMENT

All material in this document, including the figures, is subject to copyright protections under the laws of the United States and other countries. The owner has no objection to the reproduction of this document or its disclosure as it appears in official governmental records. All other rights are reserved.

TECHNICAL FIELD

The technical fields are (among others): Telecommunications, Digital Communication, Computer Technology, Digital Security, and IT Methods for Management.

BACKGROUND ART

Recent years have brought the emergence and rapid proliferation of mobile computing devices such as mobile telephones or handsets with extensive computing, communication, and input and interaction capabilities ("smartphones") plus a growing array of other mobile computing devices such as touchscreen tablets, netbooks, electronic document readers, and laptops in a wide range of sizes and with wireless and wired communication capabilities. This proliferation of mobile devices has been accompanied by complementary advances in the development and adoption of long range, wireless broadband technologies such as 3G and 4G, as well as commonplace deployment of shorter range wireless technologies such as the 802.11 series of wireless standards and BLUETOOTH® short range wireless, all with considerable bandwidth. These technologies span multiple radio frequency bands and protocols. Alongside the radio transceivers for such communications capabilities, many of these devices also contain an array of onboard sensors such as cameras, microphones, and GPS receivers plus other locating technologies, as well as considerable fixed-onboard and removable memory for information and multimedia storage. Furthermore, smartphones and similar devices are typically capable of running a wide variety of software applications such as browsers, e-mail clients, media players, and other applications, which in some cases may be installed by the user.

Along with the profusion of smartphones and other mobile, wireless-capable devices, there has also been a dramatic increase in the use of social networks and related technologies for information sharing for consumer as well as for professional uses. Access to social networks on mobile devices has heightened concerns about individual, government, and corporate information security, and about possibilities for privacy violations and other unintended and undesirable information sharing. Furthermore, the possible professional and personal use of any given handset presents a complex set of usage contexts under which rules for device capability usage and information access need be considered.

Such sophisticated and capable smartphones and similar devices, along with the vast amounts of information that they can contain and access, present a large set of potential security vulnerabilities (a large "attack surface") that might allow information to be accessed by malicious parties or allow undesirable use and exploitation of the device capabilities for malicious purposes such as "phishing" fraud, other online fraud, inclusion in 'botnets' for spam transmission, denial-of-service attacks, malicious code distribution, and other undesirable activities. Furthermore, compared with conventional desktop personal computers, smartphone handsets by nature are portable and thus more easily stolen. Portability also means that the devices will encounter more varied security contexts difficult to foresee, and which may only occur once or twice during the lifecycle of the device. The mobile threat landscape is complex and presents a vast set of extant and emergent security concerns. Therefore, there is a pressing and growing need for comprehensive and secure systems for controlling access to the capabilities and information present on the mobile devices.

Policy enforcement mechanisms and policy frameworks even rule-based ones exist in the field of art. See, e.g., U.S. Pat. Nos. 5,881,225; 7,140,035; 7,246,233; 7,640,429 (which shares a common inventor with this application); 8,127,982; 8,285,249; 8,463,819; 8,468,586; US 2009/0205016; US 2013/0029653. However, even where they are not merely limited to authentication, or highly specialized applications (e.g., parental controls), existing technologies are ill suited for today's mobile network environments. None disclose an architecture or means of policy development and verification suitable for such a diverse set of devices and potentially hostile environments contemplated by the present disclosure.

In contrast, the technology presented in the disclosure herein pertains to a very granular and secure policy-based control of capabilities, information access and resource usage on handsets and other mobile computing devices. Also presented are certain methods, techniques, and system architectures for preserving the confidentiality of system communications and stored information; for removing, or eliminating exposure of, certain security vulnerabilities; and for defending the system and the handsets to be protected from various kinds of attacks and unwanted activities.

In particular, novel aspects of the present disclosure include (for example): a client/server architecture which protects data by having secured and unsecured areas of operation; policy development, verification, and introspection means usable in modern wireless devices and the devices that may communicate over them, particularly through the use of secured and unsecured architecture and message transmission schemes; storing of policies in secured areas, as well as the caching of server-provided policies and rules for faster access, wherein the cached data can be stored in a secure area; use of policy enforcement points within a secured area, in order to further prevent malicious access by untrusted entities; data protection using a secure environment along with a façade application that is accessible to the untrusted environment, wherein the façade application interacts with the secure environment in a limited manner; utilization of message root of trust information, as coupled with policy-based control, that utilizes a secure environment; code execution based on trusted chain information; and utilization of secure environment areas based upon policy-based information.

SUMMARY OF THE INVENTION

The present invention is a secure, highly scalable, policy-based access and resource control system for protecting computing devices from various threats, and for controlling their usage and access to information.

One key approach to defending these security-related systems and components from malicious attack is to have all or part of them reside in specially configured secure areas, partitions, or environments on the device hardware that are inaccessible to unauthorized parties, and which cannot be accessed for unauthorized purposes. The secure areas can be configured separate from the main device operating system. In some instances, the secure areas can be configured to prevent access to certain resources. A further level of security can be provided if such secure areas or partitions are configured to be invisible and/or undetectable, to the greatest degree possible, to unauthorized parties, or under unauthorized circumstances. The present document describes uses and applications of such secure environments (SEs), along with various aspects of secured capabilities that are coupled with a system for policy-based management and security for mobile computing devices.

Note that while the devices, apparatuses, systems, methods, and techniques described herein are applicable to mobile handset security, those skilled in the art will recognize that much of what is described can be applied to other areas of information access and computing device security. The terms "handset", "smartphone", "mobile device", "mobile handset", "mobile computing device", and so forth in this document are interchangeable with each other, and should also be interpreted to encompass any computing device that may benefit from the invention, not solely smartphones or similar devices. Neither the description nor the examples should be taken as limiting the generality or the applicability of the invention to mobile handsets and wireless networks specifically.

DESCRIPTION OF THE EMBODIMENTS

The following describes preferred embodiments. However, the invention is not limited to those embodiments. The description that follows is for the purpose of illustration and not limitation. Other systems, methods, features and advantages will be or will become apparent to one with skill in the art upon examination of the following figures and detailed description. It is intended that all such additional systems, methods, features and advantages be included within this description, and be within the scope of the inventive subject matter, and be protected by the accompanying claims.

Figure 1:
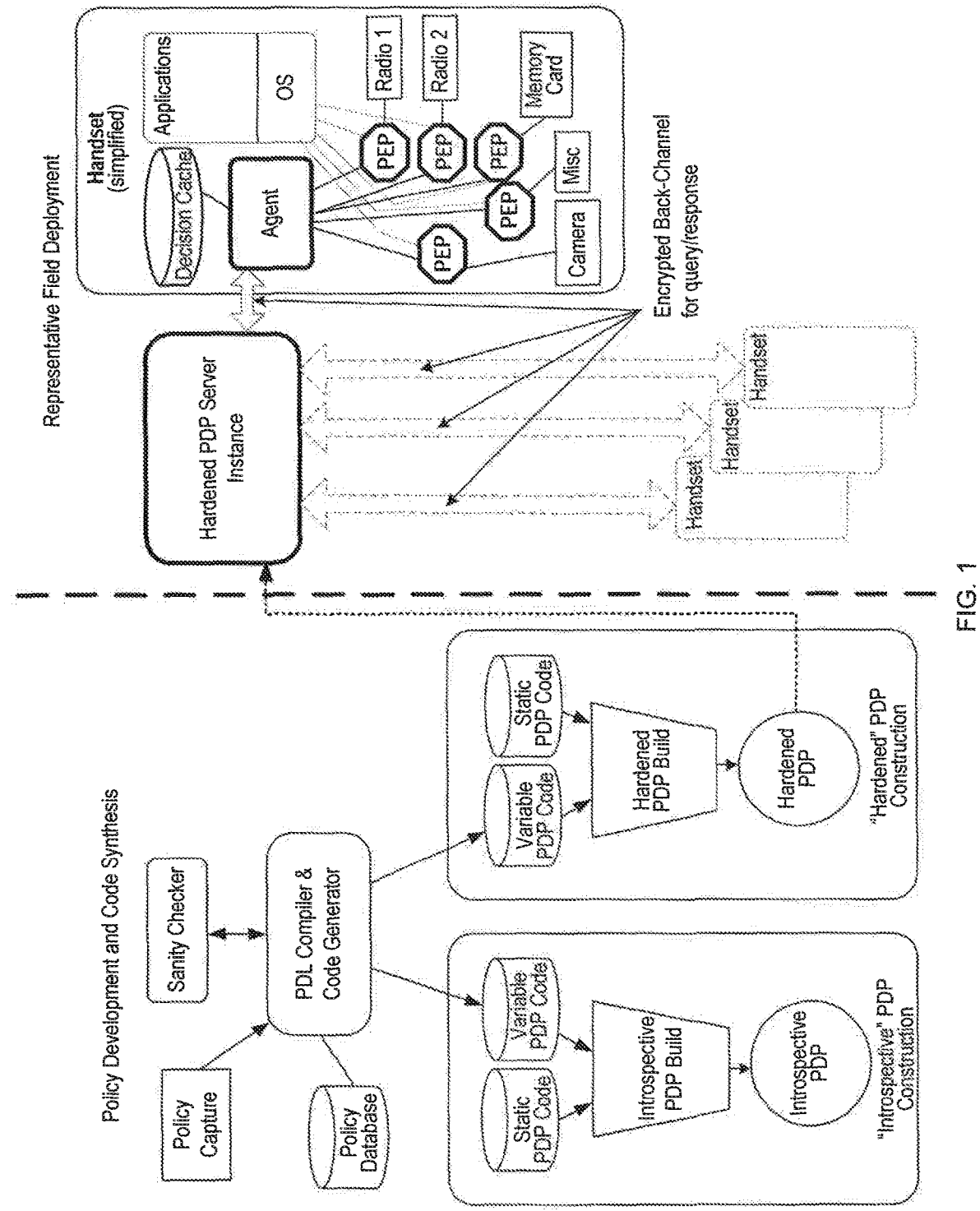
FIG. 1 is a schematic representation of a policy-based access control and Management system for mobile handsets.

The present invention pertains to a secure, highly scalable, policy-based access and resource control system for protecting mobile computing devices from various threats and controlling their usage and access to information. In particular, the present invention builds upon U.S. Utility application Ser. No. 13/945,677 (incorporated by reference above) and adds, among other features, secure areas for data processing and storage which are separate from untrusted environment areas of operation. The basic system presented in the incorporated application is summarized in FIG. 1 from the prior application. The system described therein provides extensive granularity of control over permitted operations, along with network, file system, and device access on handsets controlled by the system. Furthermore, the system utilizes one or more policy decision point (PDP) servers which respond to encrypted queries from handsets controlled by a given instance on the system. These PDP servers may be remote from the handset, or may even be hosted within the handset. The queries typically encapsulate requests for use of specific handset or network-accessible assets, and the PDP response to such a request is then received by the querying handset. Subsequent decisions are made by the PDP and then enforced by the Policy Enforcement Points (PEPs) on the handset.

In the present invention, additional security advantages are gained by incorporating secure, limited access areas and other secure and trusted environment aspects into the system architecture. Additionally, policy based methods can be employed to govern access to secure areas.

Figure 2:
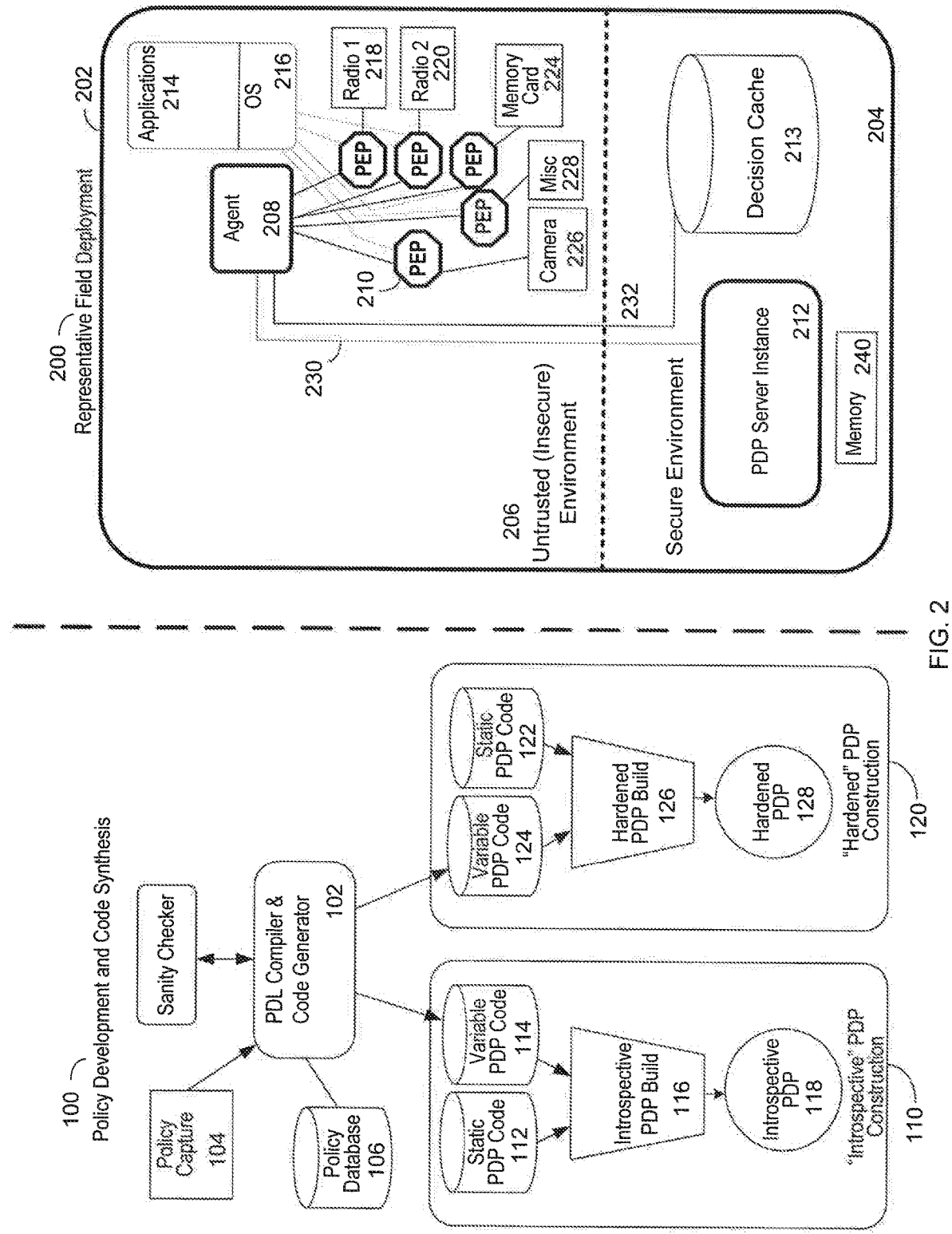
FIG. 2 is a schematic representation of one instance of a Policy Decision Point (PDP) server instance housed locally inside a secured area of a handset.

FIG. 2 is a schematic representation of one instance of the PDP server instance housed locally inside a secured area of a handset. This description is intended to be an overview of the certain aspects of the present invention, while also describing various aspects already covered in the pending earlier application Ser. No. (13/945,677). Building upon the prior descriptions, the left portion shows the Policy Development and Code Synthesis 100 which includes both an "Introspective PDP Construction" 110 and a "Hardened PDP Construction" 120. The invention can utilize a unique policy definition language, or policy object language (POL) for describing polices to be enforced, which might include tag-based policy definitions, and a specialized structure for hierarchical policy-set representation and processing. In one embodiment, the invention includes a specialized POL compiler 102 that dynamically generates and outputs software source code containing a policy logic implementation for a given policy set that is then combined with supplementary static code elements from compilation into PDP server executables. The policies can come from Policy capture operations 104, or from existing (prior developed) policies that might exist in a database 106.

Two distinct forms of these executables, compiled from distinct but functionally similar code bases, are employed in one embodiment of the invention. First, the introspective version 110 is shown and is suited to purposes such as policy development, feature development, debugging, functional verification and testing. Static PDP code 112 and variable PDP code 114 are utilized to achieve an Introspective PDP Build 116. An introspective PDP 118 then results and can be used for development and testing, before being implemented in a hardened PDP environment.

The second higher performance hardened executable server 120 is shown for deployment purposes. Similarly, the hardened version uses static PDP code 122 and variable PDP code 124 to achieve a hardened PDP build 126. A hardened PDP 128 then results and can be utilized directly in a deployed PDP Server instance. Instances of these latter, hardened PDP executables handle queries from client handsets in the field and provide responses. PDP servers compute policy decisions based on policy-based logic plus handset state information and other contextual information such as user role and location that may be available.

For clarity in describing the present invention, the following subsections describe different aspects of the system and methodology for practicing different embodiments.

1. Secure Deployment of PDP Server Onboard a Handset within Trusted Environment or Secure Area The right portion of FIG. 2 also shows a representative field deployment 200 of a PDP server instance housed locally inside a secured area of a handset. In the depicted embodiment, a representative mobile computing device 202 is shown that utilizes a secure environment 204 and an untrusted (unsecure) environment 206. The mobile device includes agent software 208 and a representative collection of policy enforcement points (PEPs) 210 that are resident on handsets protected by the invention. A specialized PDP server instance 212 is shown that serves as a Policy Decision Point (PDP) and which contains defined versions of policies and processing logic. In this instance, the PDP Server instance is shown located in the secure environment 204 for added protection against unwanted access to the PDP information. The mobile device also contains applications 214 and an Operating system (OS) 216 that interacts with the PEPs. The PEPs serve as enforcement points between various devices which communicate (or exist) in the untrusted environment 206 of the mobile computing device. The example devices include a first radio 218, second radio 220, memory card 224, camera 226, and other miscellaneous devices 228. The PDP Server instance 212 communicates with the agent 208 via a secure line of communication 230. A decision cache 213 is also shown located in the secure environment 204 which communicates with the agent 208 via a secure communication connection 232. By locating both the PDP Service instance 212 and the Decision cache 213 in the Secure Environment 204, a more secure device is provided for applying the security approach of the present system.

Further addressing the PDP implementation in the handset, in one embodiment the handset can be protected via installed software (termed "DEADBOLT"™) with capabilities including an agent implementation 208 for performing secure query and response communication with remote PDP server instances (212) and other supporting tasks, and for managing enforcement of policy-based decisions, either directly as received from a query-response the PDP, or from a local decision cache 213. Enforcement of decisions resulting from handset queries to a PDP, or of cached decisions, is performed at the PEPs. The PEPs are typically inserted via software on the handset, or in some cases inserted at a lower level than the device operating system in order to eliminate certain vulnerabilities, including (for instance) undesired root access and other exploits. The PEPs thereby serve to provide rigorous enforcement of access decisions, in some cases by appropriately controlling access to resources and information located on the handset or elsewhere, such as in a remote location on a network, and by monitoring the execution of allowed actions. In some cases, such control will consist of appropriately allowing or denying access to a resource. In other cases, intermediate limits on the usage of certain resources can be applied, such as bandwidth throttling, Quality of Service (QoS) limitations, or access limitations through priority levels. For example, variable control might include invoking the maximum picture capture resolution allowed from a camera, and/or the maximum memory and CPU utilization allowed for use by any particular application.

In association with the system architecture shown, certain example attributes are central to the security and operation of the present PDP server 212. In relation to FIGS. 1 and 2, these include the following:

(a) The PDP server 212 can be housed, either wholly or partially, in a secure environment 204 on the mobile device 202.

(b) The PDP server 212 can run entirely within the secure environment 204, including (for instance) the use of memory 240 and other computing resources that are accessible only from within the secure environment.

(c) The PDP need only respond to queries from local sources on the device, over secure local communication channels. In this manner, there will be no externally visible or vulnerable ports or other attack surfaces for a malicious user to access.

(d) Individual on-handset components can communicate directly with the PDP server 212 and query the server—for example, regarding permissible access and operations—with no externally visible communications, and can do so independently of the non-secure elements on the handset.

(e) System communications should not be exposed to eavesdropping, other monitoring, or tampering and corruption by undesired parties.

Figure 3:
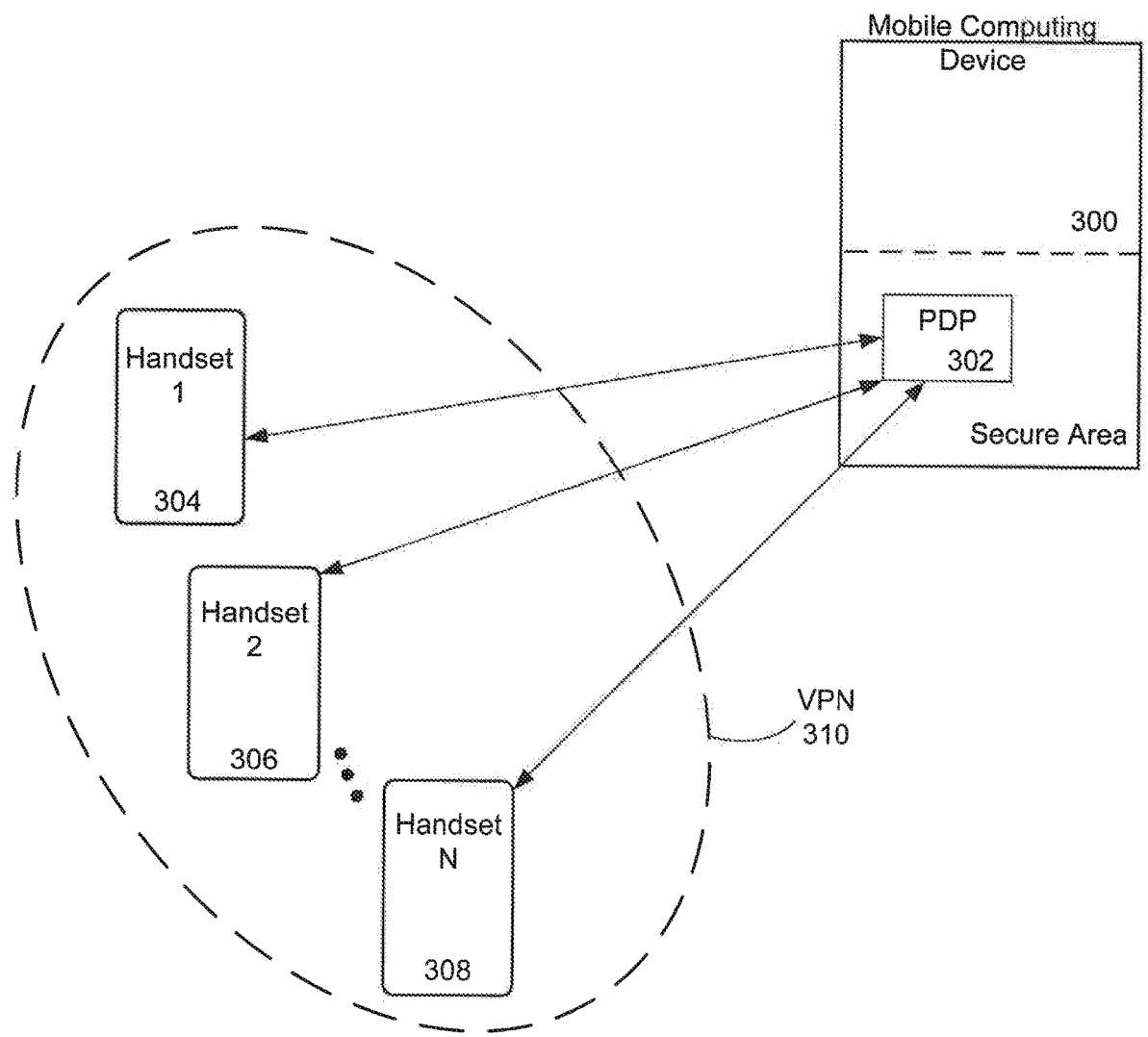
FIG. 3 is a representation of a main handset having a secure PDP, and other handsets in an associated Virtual Private Network (VPN, or similar means) using the secure PDP.

FIG. 3 shows another variant of the present system. In this configuration the PDP server 302 is housed in the secure area of one mobile computing device 300 (e.g., handset). This secure PDP may be used to receive and respond to queries regarding authorization actions from a restricted set of other handsets. For instance, Handset 1 (304), Handset 2 (306), and Handset N (308) can operate within a group on a local restricted network, or on (for example) a Virtual Private Network (VPN) 310. A valid, hardened and secure PDP might be available on one handset, and via the use of a private or secure network the other handsets can utilize the PDP decision-making power of that hardened PDP Server. This allows for the hardened system security resources to be shared by many other devices.

Figure 4:
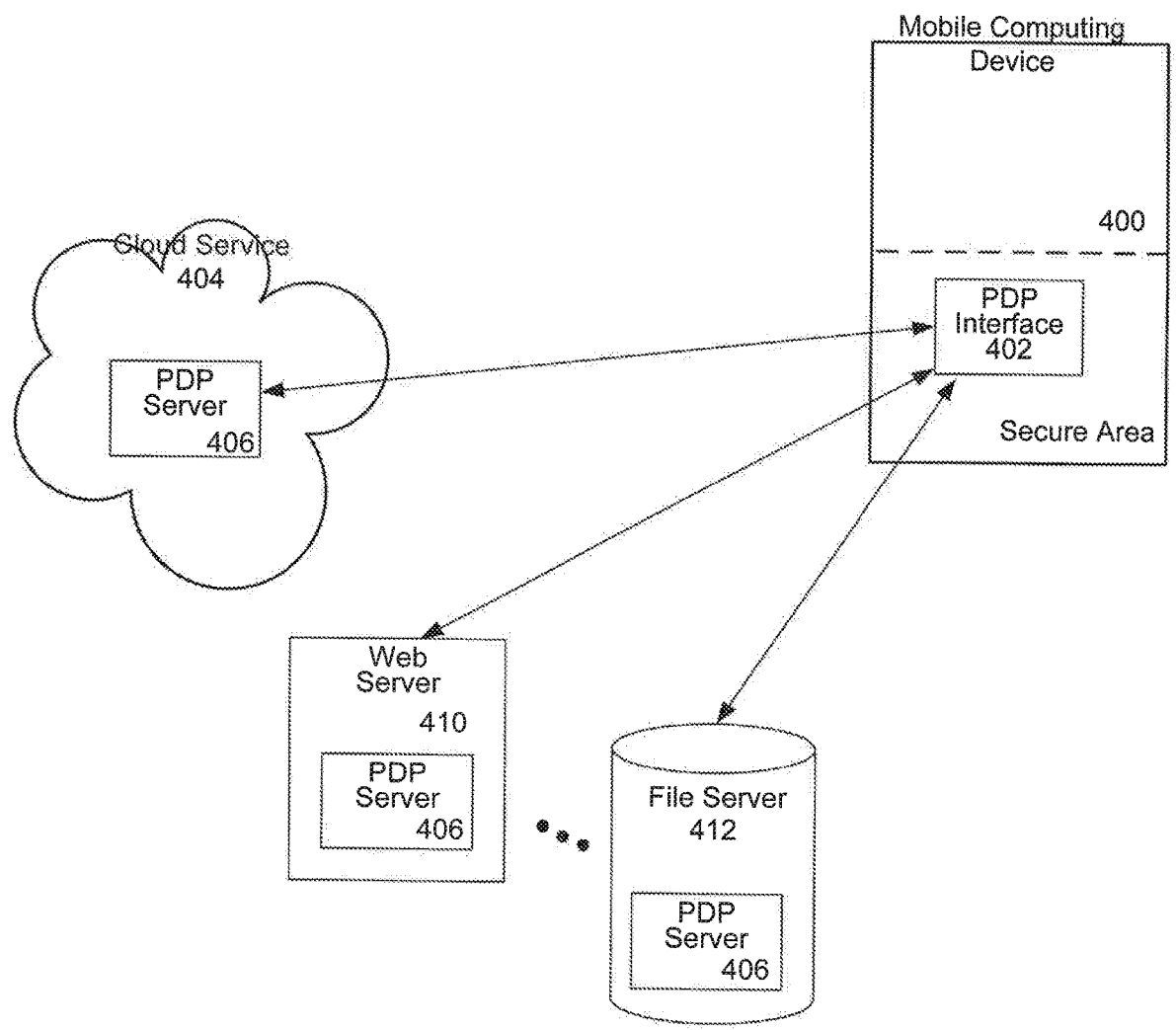
FIG. 4 is a representation of a mobile computing device having a PDP interface that communicates with a PDP service located remotely in another service or cloud area.

FIG. 4 illustrates that the secure environment to be coupled with the present policy-access control and management system that can reside within an device or external server. In this embodiment, the mobile computing device 400 would have a PDP interface means 402 within the secure area of the device. The actual PDP server would reside in variety of other external devices or services. A cloud-based service 404 is shown with the PDP Server 406 (e.g., hardened or otherwise) existing within the cloud service environment. A web server 410 is next shown with the PDP Server 406 incorporated and running within. Next a File Server 412 is shown with the PDP Server 406 incorporated and running within. In each instance, a secure communication link can be used to provide access calls from the secure area of the Mobile Computing device. In this manner, the workload on the handset can be lessened, with the PDP processing being performed by remote (external) servers or processing centers.

2. Secure Caching of Policy Decisions Onboard a Handset Within a Trusted Environment or Secure Area In addition to the embodiment shown above where the PDP server itself is housed inside a secure area, the present invention includes the possibility of maintaining a cache of previously made policy decisions within a secure area. This is illustrated above in the Decision Cache 213 of FIG. 2 being in the secure area 204 of the mobile computing device 202. This cache can be used to reduce queries to external PDP servers, along with reducing the security risks associated with such external queries. The Decision cache can also be useful in situations where the handset and/or PDP server are offline or unavailable for any reason. This cache can also prove to be useful in situations where preventing external communication is advisable to preserve anonymity or to maintain "radio silence".

Figure 5:
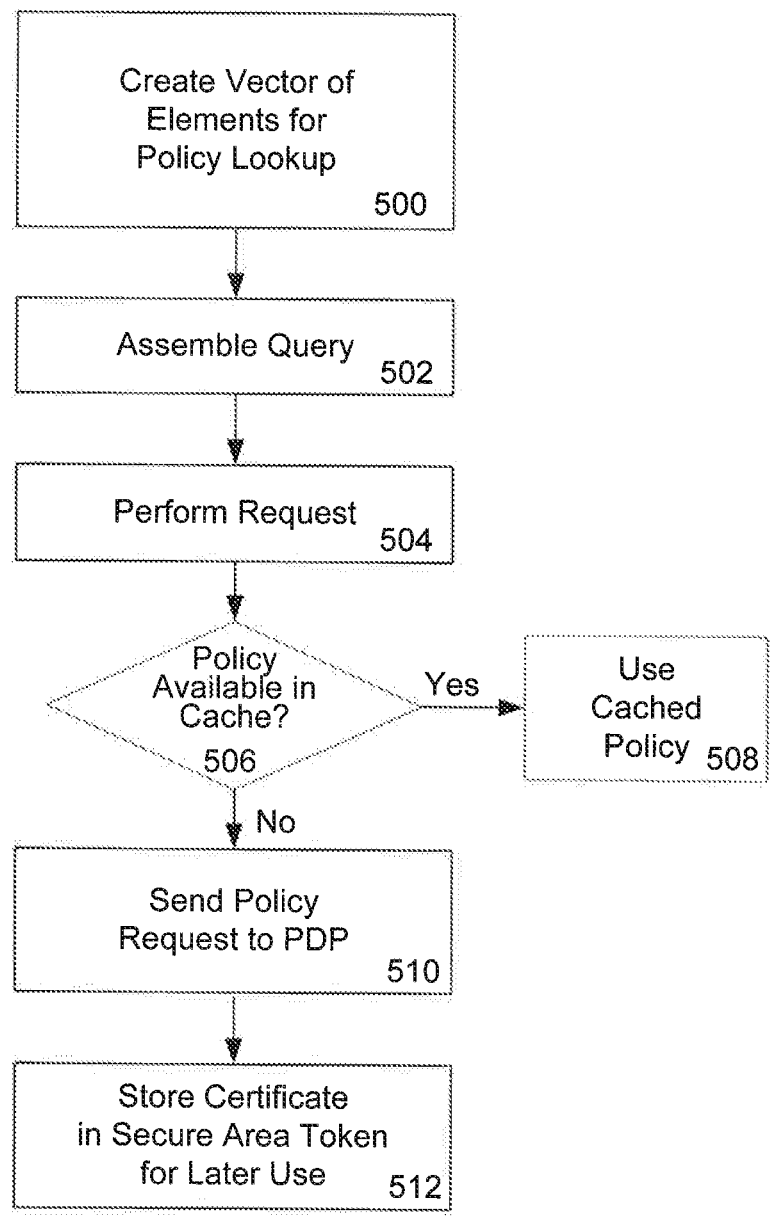
FIG. 5 is a representation of steps that might be used to retrieve a decision policy from a decision cache.

FIG. 5 illustrates one potential implementation of the system for a secure area cache, which includes the following steps:

(1) Create a vector of elements that are normally used for policy lookup (500);

(2) Assemble a query (502);

(3) Perform a request for a policy (504). This request might be made in the form of a token, and be sent to the secure area to retrieve the cached policy decision, if one is available. The request is expected to be signed and encrypted, and possibly protected by other means to prevent undesired viewing or tampering or other malicious usage. To speed access in the Policy Decision Cache, the identifier or unique serial number (SN) of such a token could be used as a hash function, and hence the index mechanism, that is used with the token to find the policy on the behalf of the requestor.

(4) Determine if the desired policy is available in the secure area cache (506). If the entry is available, then retrieve and use that cached policy entry (508).

(5) If the appropriate cache entry is not present in the secure cache area, then proceed to obtain a decision through a request to the PDP (510). In this example, the PDP may generate a certificate that contains such a SN or index hash, as well as the policy decision.

(6) The device then stores this certificate in the Secure Environment token for later use (510).

Figure 6:
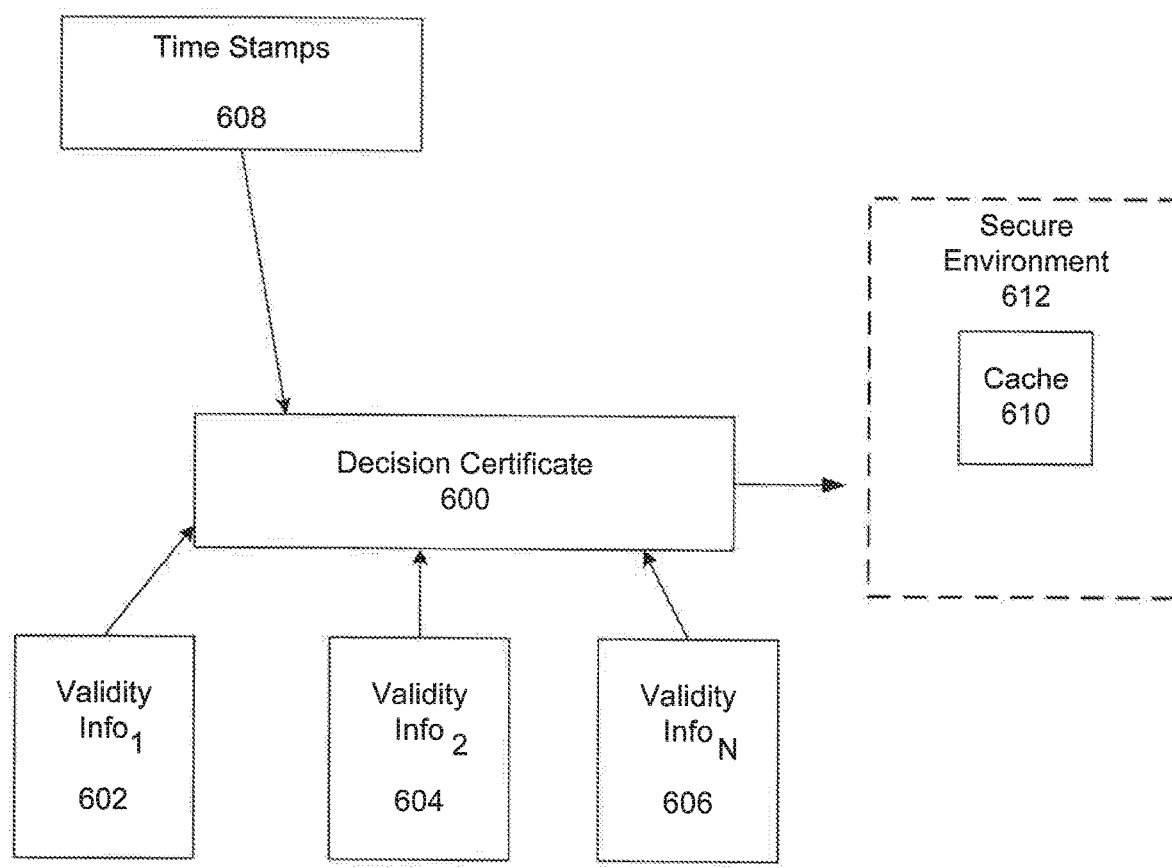
FIG. 6 is a representation of components that might go into creating a decision certificate.

The described caching method has certain benefits and advantages. For example, timestamps and other validity-related information can be embedded within the cached certificate. The clock elements of the certificate can then be enforced by, for instance, a trusted clock on the device. FIG. 6 demonstrates how a variety of information can be used to formulate the example Decision Certificate 600. A first instance of validity information 602, along with a second instance of validity information 604, and so forth until the Nth instance of validity information 606 is shown being used to create the Decision Certificate 600. Validity information can be anything ranging from date ranges, to location information, to user-based parameters. When combined with timestamps 608, the decision certificate then becomes a powerful security check that can be enforced and validated by a trusted clock on the resident device. The decision certificate can then be stored for retrieval and subsequent use in the cache 610 in the secure environment 612.

Figure 7:
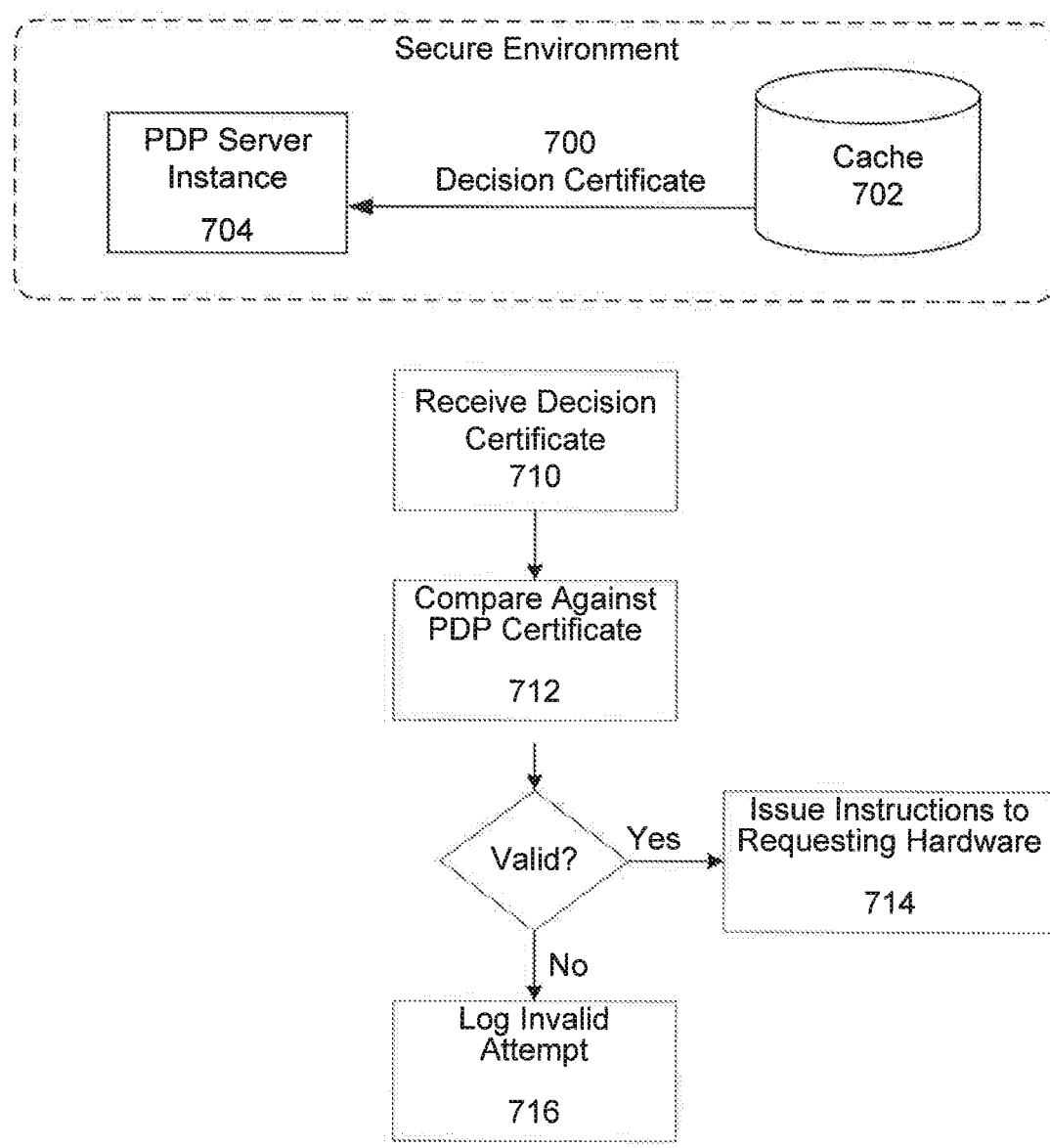
FIG. 7 is a representation of steps and components that might be used to validate a decision certificate.

Policy decision validity can be enforced by a secure environment area check of the decision certificate against the PDP certificate, thereby providing an authenticity decision. FIG. 7 shows the decision certificate 700 being retrieved from the Cache 702 for comparison against a PDP certificate as found in the PDP server instance 704. The example flowchart further details the process. First, a decision certificate is received (710). This decision certificate is then compared to the PDP certificate (712). If the received decision certificate is valid, then instructions are issued to the requesting hardware or device (714). If the received decision certificate is not valid, then the invalid attempt can be logged for later security system review and analysis (716).

Cache flushing can additionally be performed via token Application interfaces (APIs) that allow navigation of token content. Additional attributes that are presently associated with a cache entry can thereby be encoded into the decision certificates.

3. Policy Enforcement Points Coupled With Trusted Environment or Area

Figure 8:
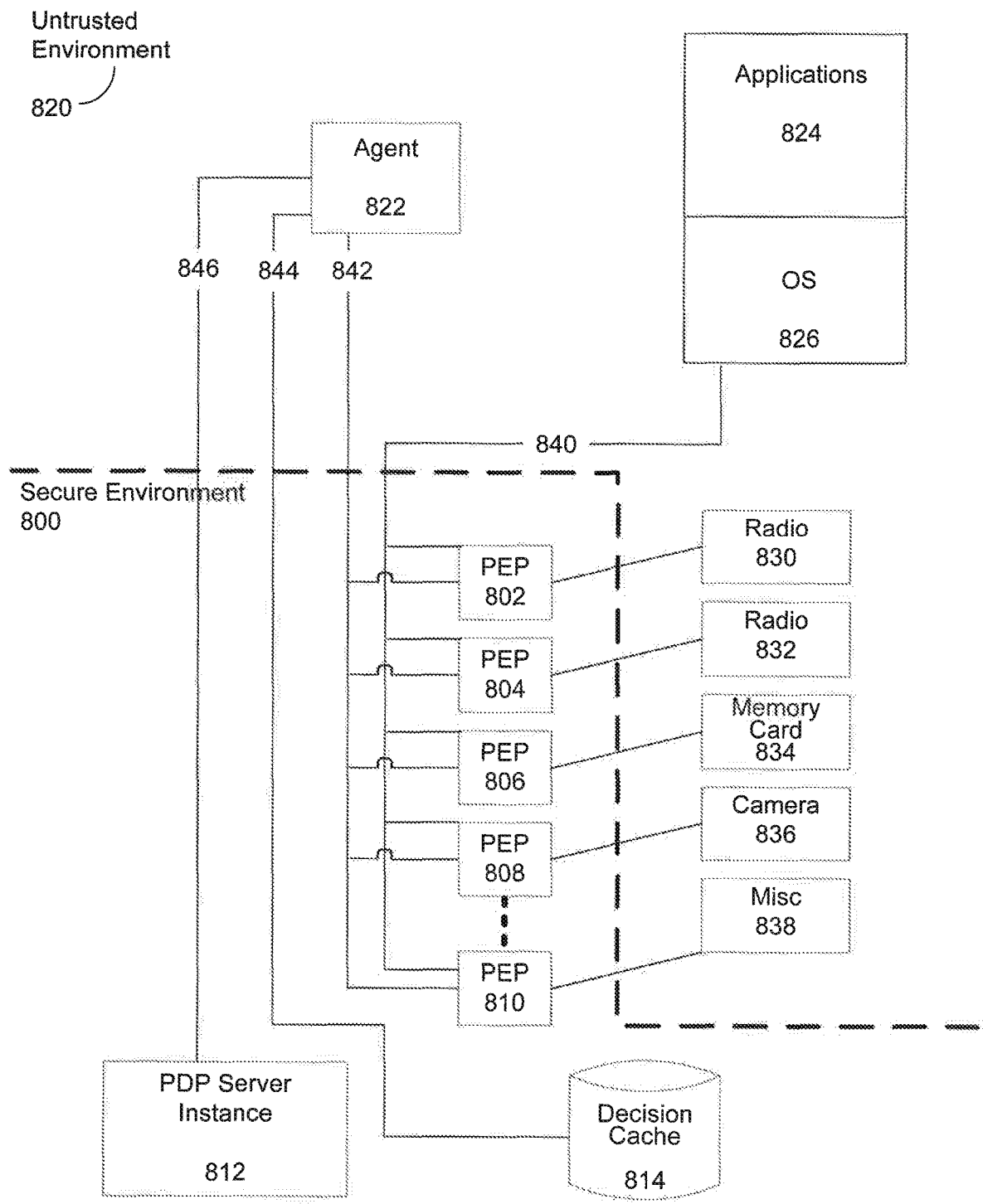
FIG. 8 is a representation of a handset where the PEPs are located within the secure environment.

The present system employs the use of PEPs as described previously, as used for intercepting access attempts and for controlling access to handset functionality and features. In one embodiment, it is advantageous for the PEPs to exist within the secure environment, in order to eliminate malicious access to the PEPs by untrusted entities. By locating the PEPs in a secure area, they are hidden as potential attack surfaces. FIG. 8 shows an example embodiment of this configuration. In this instance the secure environment 800 (via software or hardware, virtual or otherwise) extends to include the PEPs 802, 804, 806, 808, and 810 which are located in the secure area. The PDP Server instance 812 is also located in the secure area, along with the decision cache 814. The untrusted environment 820 continues to include the agent 822, along with the Applications 824 and the OS 826. The example external interface devices radio 1 (830), radio 2 (832), memory card (834), camera (836) and miscellaneous device (838) are configured to communicate with the PEPs across the secure boundary without exposing the underlying handset (or mobile device) to outside tampering. Similarly, the applications 824 and OS 826 communicate with the PEPs across the secure boundary via a secure connection 840, and the agent communicates with the PEPs via a secure connection 842. The agent 822 communicates with the decision cache 824 via secure connection 844, and with the PDP Server Instance 812 via a secure connection 846.

Figure 9:
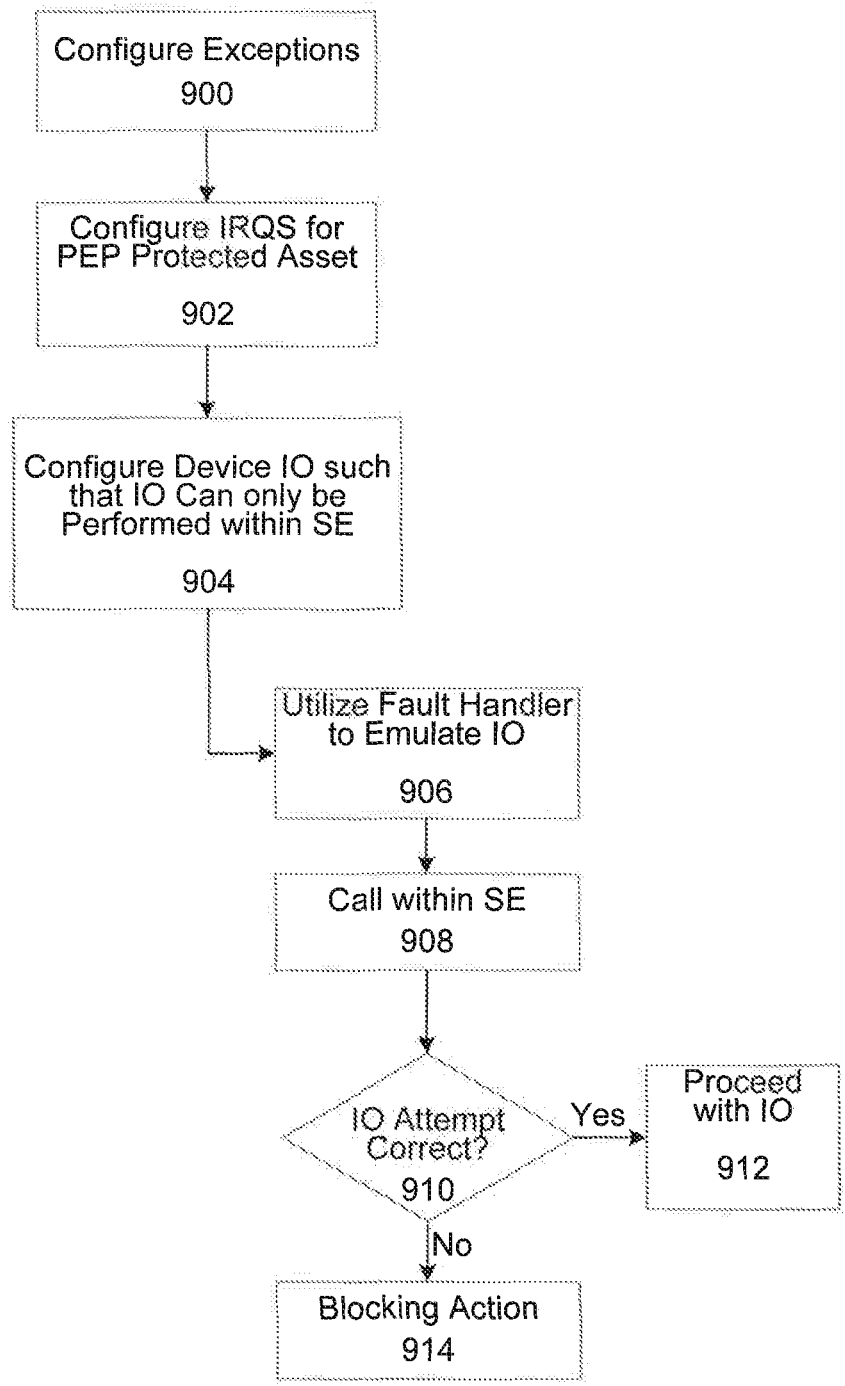
FIG. 9 is a representation of how IRQs might be used to securely communicate with protected PEP assets.

The resulting configuration suggested by the figures can be achieved via hardware and software implementation, or a combination of both. One example embodiment and mechanism for achieving such security would be to insert the PEPs as function calls within the secure environment such that they are protected from malicious attack. The PEPs should also be configured in such a way that they are difficult to bypass or subvert. A series of implementation steps are suggested below in FIG. 9 and are meant to serve as one non-limiting example of ways in which this security could be achieved. The primary idea is that the PEPs reside in the secure environment as a means of shielding them from attack, wherein such residence can be accomplished in a variety of ways. In the first step 900, exceptions need to be configured for the SE and the untrusted world. These exceptions could take many forms, but should be configured to delineate what is allowed in the SE versus that of the untrusted area. Next, it is important to configure corresponding Interrupt Requests (IRQs) for the asset to be protected by the PEP (902). These IRQs are delivered to the untrusted world and serve as one key interface between the secure area and the untrusted area, Next, the device input and output (IO) should be configured such that the device IC) can only be performed within the secure environment (904). Any untrusted world attempts to access the underlying hardware should, for instance, cause an error trap back in the SE, or a similar capability to monitor and track any unwanted attempts to access the system. These various entry or access points into the system, from the outside world, are where the PEPs should be inserted.

Additional functionality might need to be implemented in order to fully realize the configuration to be implemented in step 904. Accordingly, 906 shows the creation or utilization of a fault hander for interaction with the untrusted world that emulates the IO by a secure monitor call (SMC) to the SE. Thereafter, 908 provides functionality so that a call with the SE completes the IO attempt. The validity of the IO attempt is checked in step 910. If the attempt is valid, then the process 912 proceeds with a return back to the untrusted world. If the IO attempt is not correct, and the attempt is not allowed by the policy, then a blocking action 914 can be used. A notification can also be created for later tracking and analysis of the system security.

4. Data Protection Using Secure Environment and Façade Application

Sensitive data on the device should be protected and inaccessible to outside threats. Essentially the sensitive data should be rendered invisible to such unauthorized parties. However, it might be useful for certain applications in the untrusted world to make use of certain data stored in the SE without actually seeing or knowing the results of that data. One example would be an e-commerce "store" application in which purchases ideally would take place without personal banking information or credit card data being exposed. Another example might include sensitive enterprise data that an enterprise employee or contractor might need to make use of, but should do so without having visibility into the data content.

Figure 10:
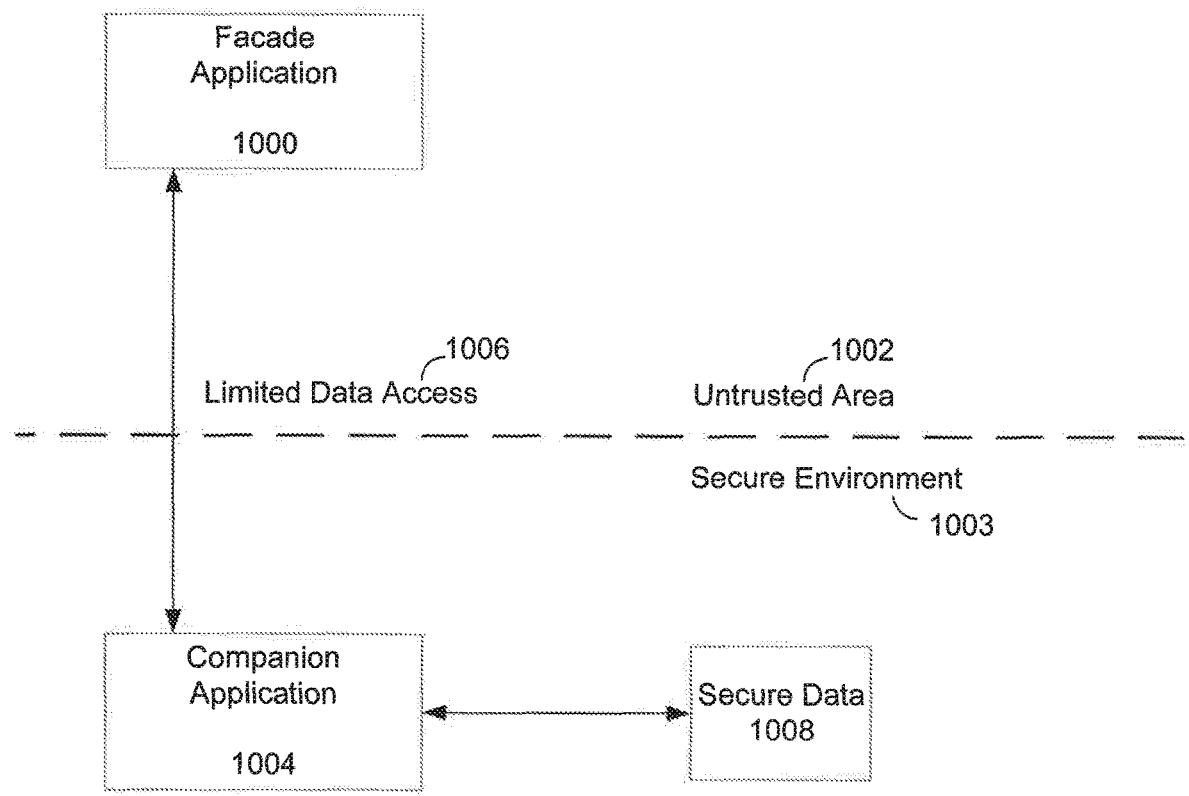
FIG. 10 is a representation of a façade application in the untrusted area being in secure communication with the paired companion application in the secure area.

One solution to this situation includes the use of a "façade application" that resides in the untrusted world, and is paired with a companion application in the SE. FIG. 10 shows a representative example of such a façade application 1000 that exists within, and interacts with, the untrusted world or unsecured data area 1002. A companion application 1004 resides within the secure environment 1003 and is paired with the façade application 1000. The paired façade application and the companion application could be implemented in a variety of ways. For example, the pair could be coupled using limited data access and/or trusted calls 1006 to the secure environment.

Data stored in a secure area 1008 would only be accessed by (and through) the companion application 1004 in the SE. Data would generally not be unencrypted in the untrusted area 1002. The data would move in and out of the SE—such as to an external server in an encrypted form. Data can be decrypted for processing and use inside the SE. The decrypted results and processing results can then be handed out on a limited and controlled basis—to the façade application 1000 in the untrusted area 1002.

5. Root of Trust Utilization Couple with Secure Environments and Policy-Based Access Control In systems where information security and security of other assets is of concern, chains of trust are often employed. In such configurations, each trusted element or component has a certificate of trust or other degree-of-trust statement that is traceable and verifiable to a "root of trust". Such a root of trust is commonly a compact, hard-to-modify, hardware component. Other roots of trust also exist, such as stored certificates on hardened, secure servers that are suitable for networked environments. The present invention can make use of such a root of trust to provide additional security for a policy-based access control and management system, such as the one described in the incorporated-by-reference application Ser. No. 13/945,677.

One important aspect of such a system is the rank of ownership of a given policy owner. Generally, a policy or set of policies by a higher ranking owner takes precedence in the underlying decision analysis, and will overrule a policy owned by a lower ranked owner. Such ownership can be verified and made query-able by requiring certification and traceability of the policy ownership back to the basic or fundamental root of trust.

Additionally, the pristine (or untampered-with) state of a given policy can be verified through key-pair based signing of a given policy or policy set, with the signing certificate again being traceable back to the basic root of trust. Other verifications, for example, of the authenticity of the decision output itself can be made through signing of the decision output, which is again traceable in the trusted chain back to the root of trust.

Figure 11:
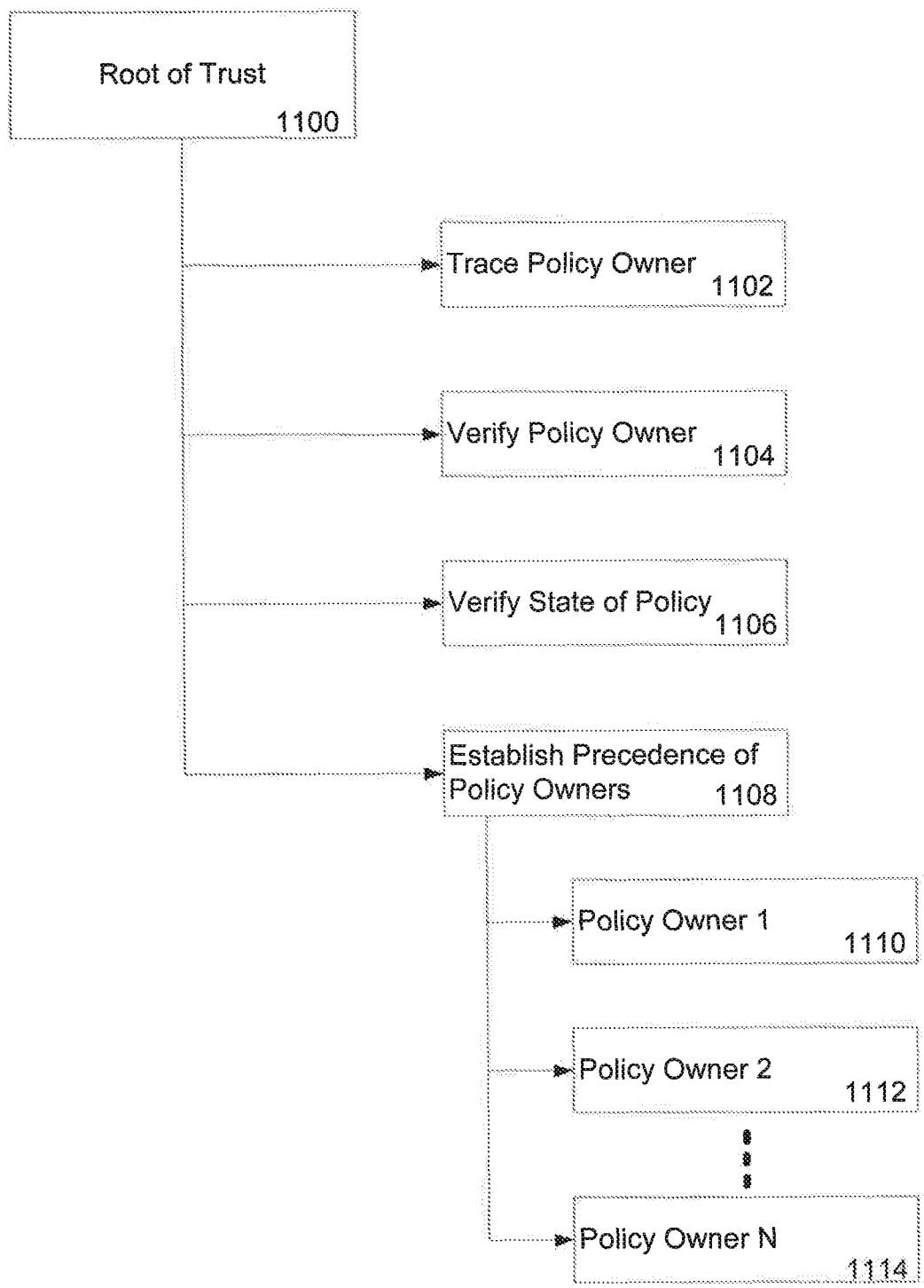
FIG. 11 is a representation showing example traces or verifications that might rely upon a fundamental root of trust.

FIG. 11 shows an example of various policies that could be traced back to the root of trust 1100—via a signing certificate or other comparable means—in order to verify the need at hand. Both tracing 1102 and verification 1104 of the policy owner can be performed. Owners can have at least one digital certificate associated with them and their identity to assist in tracing and verification. The state 1106 of the policy can be verified (e.g., whether the policy has been tampered with or not). Additionally, the root of trust can be used to establish the precedence of the policy owners 1108. In this instance, policy owner 1 (1110) has a higher ownership rank than policy owner 2 (1112). An Nth degree of policy owners (1114) could similarly be compared and ranked in terms of their particular precedent in policy execution.

6. Trusted Code Execution Using Untrusted Resources

The present invention also provides a method of having code execute (or not) in a non-trusted state that is derived and traceable to a trusted chain. One advantage of having such a capability is that greater system resources can be utilized. For instance, a block of otherwise untrusted additional RAM or memory can be used with some degree of trust to operate on secure operations. The method consists of using a processor that is trusted, or in a trusted state, and coupling it with a marked executable region that the processor might operate within, or operate on. If an attempt is made by the processor to execute non-trusted code, such as code not loaded while in a trusted state, then a fault or exception is noted. The trustworthiness of the code should be traceable to a root of trust such as that described above. Loading of trusted-only code can be made enforceable via a trusted load mechanism.

This method can additionally be augmented by "coloring" or designating specific areas of RAM or memory or other registers such that they can be marked and bound to trusted regions. In operation, the trust boundary cannot be violated once the attribute is set on the memory and bound to a particular register.

Figure 12:
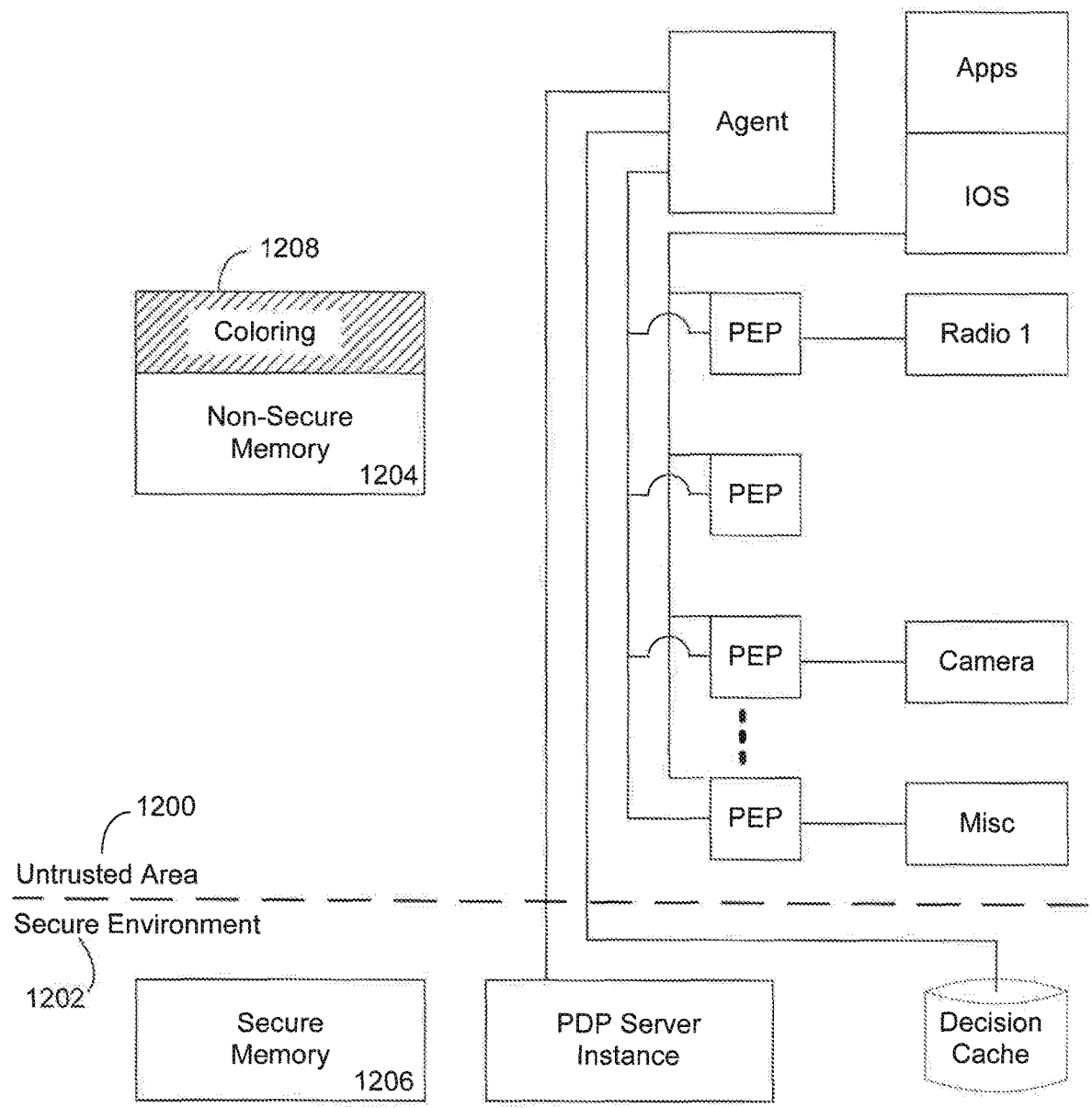
FIG. 12 is a representation showing a handset with memory areas in both the secure and untrusted areas.

FIG. 12 shows the representative handset diagram as presented above, having an untrusted area 1200 and secure environment 1202. In this instance, a non-secure memory store 1204 is shown in the untrusted area 1200. A counterpart secure memory area 1206 is shown in the secure environment 1202. The concept of coloring is generally illustrated, wherein certain registers 1208 of the otherwise non-secure memory have been designated as a trusted boundary. These registers can therefore be used, in a controlled manner, for limited secure or trusted operations, thereby freeing up processing resources of the secure area.

Note that this is different from the concept of the processor state and registers in that state. If the registers are bound (e.g., colored), then the processor state can be untrusted, and the scheduler can run code in an untrusted manner. However, when the registers reference trusted sections, then that secure boundary should not be violated.

Figure 13:
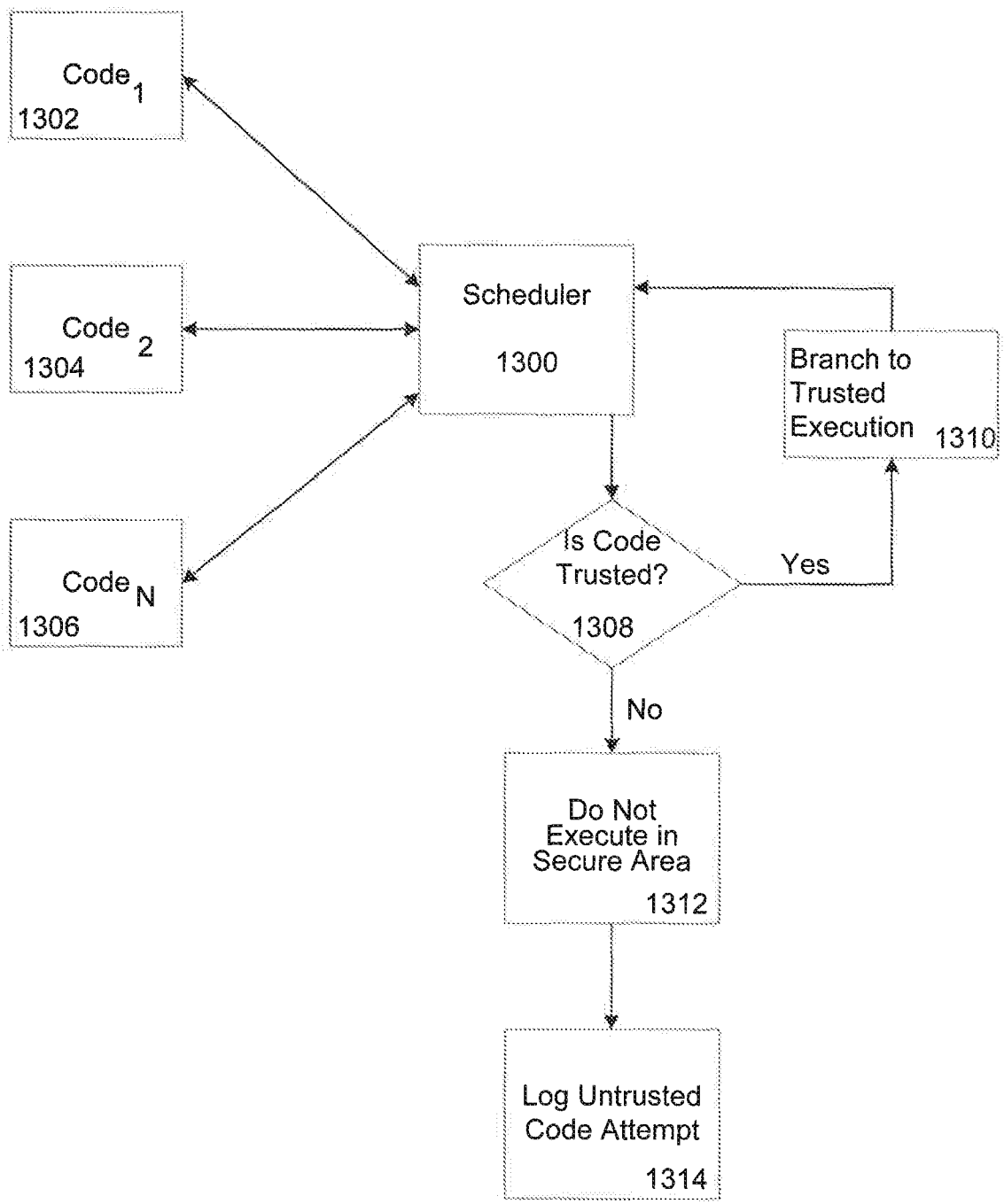
FIG. 13 is a representation of steps that might be used to schedule and run trusted code.

Security can additionally be strengthened by requiring that the transitions into trusted code execution be made possible via a trusted mechanism. In other words, a trusted root (or the like) should be used to make the execution change occur. A regular "branch" instruction by the scheduler can often be compromised. FIG. 13 shows an example diagram of the process, wherein the scheduler or similar such device 1300 is considering different representative code segments Code 1 (1302), Code 2 (1304), and so forth to Code N (1306) for execution scheduling. The scheduler 1300 uses a trusted mechanism to query 1308 whether the code is trusted. If "Yes" then a branch to trusted execution 1310 can be invoked. If the code is not trusted, then it should not be executed in the secure area 1312. Additionally, the untrusted code attempt can be logged or flagged 1314 for later analysis.

This concept can be further extended to network Application Interfaces (APIs) for function/procedure calls. The trust boundary can be manifested by representing the data object as an attribute. A higher level authority can be used to arbitrate in such a case via traceability over the network. Accordingly, data from lower levels of trust can be analyzed and possibly considered "suspect" and handled accordingly. Depending upon the level and the security desired, the data could be handled or not via the secure environment.

7. Policy Based Governance of Secure Environment Utilization

In general, the operation of secure environments is—by its very nature—a security sensitive issue. Therefore it is proposed that all of the above-described policy-based access control and management techniques can readily be used for controlling the very use of defined secure areas or secure environments. In such use cases, policies (explicit or otherwise) can be applied to limit the use of memory and other system resources. More generally, the described policy-based access control can be used to limit and control permissible activities within the secure environment.

What is claimed is:

1. A system for securely adjudicating an access request from a requesting client in an untrusted environment to a computing device, the adjudication being completely hidden from the requesting client and residing in a trusted environment, the system comprising:
   a memory having an untrusted environment and a trusted environment, said trusted environment restricting all access from the untrusted environment;
   a set of policy instructions stored only within the trusted environment in the memory;
   a decision processor resident in the trusted environment, having a policy decision server configured to adjudicate the access request by applying at least one policy instruction from the set of policy instructions to the access request resulting in an adjudicated decision granting or denying the access request;
   a decision cache within the trusted environment, the decision cache being used to store previous decisions made by the decision processor;
   an agent resident in the untrusted environment for intercepting the access request to the computing device from the requesting client where the requesting client may not have knowledge of the interception of the access request, what performs the adjudication, where the adjudication is performed, or how the access request is adjudicated, for transmitting the access request including additional parameters needed to adjudicate the request as required by the policy instructions, to the policy-based transaction server, and for receiving and transmitting access request decisions from the policy decision server on the decision processor; and
   an encrypted back-channel coupling the agent to the decision processor for transmitting the intercepted access request from the agent to the decision processor and for hiding the policy instructions, the adjudication process, and the conditions utilized by the decision processor in adjudicating the access request from said requesting client.

2. The system of claim 1, further comprising:
   at least one policy enforcement point (PEP) coupled to the agent for interacting with the untrusted environment and receiving access requests to the computing device, the PEP providing an enforcement point for the adjudicated decision made by the decision processor.

3. The system of claim 2, further comprising:
   the at least one policy enforcement point (PEP) coupled to the agent for interacting with the untrusted environment is located within the trusted environment.

4. The system of claim 3, wherein the at least one PEP further comprises the use of:
   interrupt requests for assets protected by PEPs in the trusted environment;
   input and output (IO) requests for assets protected by PEPs in the trusted environment, wherein the requests are performed in the trusted environment.

5. The system of claim 1, wherein the decision processor is located in a secure and separate location relative to the computing device being controlled, and communication between the decision processor and the computing device is achieved through a secure network connection.

6. The system of claim 5, wherein the secure and separate location includes any one of cloud service, web server, or file server.

7. The system of claim 1, further comprising:
   the memory in the untrusted environment further including registers that have been colored or designated for use with a limited amount of secure operations,
   wherein the processing load in the trusted environment can be shared between the trusted environment and the untrusted environment.

8. The system of claim 7, further comprising a non-secure memory area which has been designated as a trusted boundary, and where said non-secure area is used for limited secure and trusted operations, thereby freeing processing resources of the secure memory area.

9. The system of claim 7, further comprising the use of digital certificates and other traceable trust paths, wherein memory not located in the trusted environment can be utilized for secure purposes through the use of the digital certificates or other traceable trust paths by tagging the memory as usable for specific trusted operations.

10. The system of claim 1, further comprising:
a facade application located in the untrusted environment for interfacing user in the untrusted environment;
a secure data area located in the trusted environment;
a companion application located in the trusted environment; and
a limited access data connection coupling the facade application and the companion application, wherein secure data is not exposed to the untrusted environment and the facade application receives data to complete transactions with the user in the untrusted environment.

11. The system of claim 1, wherein the policy decision server is partially resident in the trusted and untrusted environments in the memory.

12. A system for securely adjudicating an access request for access to a secure area of a first mobile computing device and a second mobile computing device from a requesting client on the first mobile computing device using a policy decision server residing on the second mobile computing device, the adjudication being completely hidden from the requesting client, the system comprising:
the second mobile computing device having a memory with a trusted environment and are untrusted environment, the trusted environment restricting all access from the untrusted environment and including the policy decision server, the policy decision server having a set of policy instructions for adjudicating the access request from the requesting client to provide access to the secure areas of the first mobile computing device and the second mobile computing device; and
the first mobile computing device having a memory with a trusted environment and an untrusted environment, the untrusted environment having:
a decision cache within the trusted environment, the decision cache being used to store previous decisions made by the decision server;
an agent resident in the untrusted environment that is hidden from the requesting client for intercepting the access request where the requesting client may not have knowledge of the interception of the access request, what performs the adjudication, where the adjudication is performed, or how the access request is adjudicated, and for transmitting said access request to the second mobile computing device via secure communication with the second mobile, computing device,
wherein the access request from the requesting client residing on the first mobile computing device is adjudicated by using the policy decision server located on the second mobile computing device.

13. The system of claim 12, wherein the secure communication between the first mobile computing device and the second mobile computing device is achieved via a secure connection.

14. The system of claim 13, wherein the secure connection includes a local restricted network including a virtual private network.

15. The system of claim 12, wherein more than one first mobile computing device adjudicates access to its own secure areas by using the policy decision server located on the second mobile computing device.

16. A method for securely adjudicating an access request from a requesting client to a computing device having a trusted environment and an untrusted environment, said trusted environment restricting all access from the untrusted environment, the trusted environment having a policy decision processor (PDP) further having policy instructions for making policy decisions, and a policy decision cache for storing policy decisions, wherein the adjudication is completely hidden from the requesting client, the method comprising the steps:
intercepting a request for access to the computing device in the untrusted environment where the requesting client may not have knowledge of the interception of the access request, what performs the adjudication, where the adjudication is performed, or how the access request is adjudicated;
creating a vector of elements for looking up a policy to adjudicate said request for access;
assembling a query in the untrusted environment to be adjudicated by the PDP in the trusted environment;
transmitting the query requesting access to the computing device to the PDP in the trusted environment via an encrypted back-channel;
using the vector of elements to determine when a cached policy is available, and returning the cached adjudication;
retrieving policy instructions from the trusted environment for use by the PDP when a cached policy is not available;
adjudicating the query by the PDP requesting access to the computing device;
transmitting the result of the adjudication of the query back to the requesting client via the encrypted back-channel;
enforcing the policy decision in the untrusted environment using a policy enforcement point (PEP); and
storing the resulting decision in the policy decision cache for later access and use.

17. The method of claim 16, wherein storing the resulting decision further includes using a decision certificate to store decision information within the cache in the trusted environment.

18. The method of claim 17, wherein enforcing the policy decision further includes performing an authenticity check of the decision certificate against a policy decision point (PDP) certificate within the trusted environment.

19. The method of claim 16, wherein storing the resulting decision further includes embedding timestamps and validity-related information within the decision certificate and enforcing the policy decision further includes using a trusted dock on the computing device to enforce the policy decision.

20. The method of claim 16, wherein the policy decision processor (PDP) further uses a fundamental root of trust for determining at least one of:
tracing of the policy owner;
verification of the policy owner;
verification of the state of the policy; and
establishing precedence of one policy owner over another policy owner.

21. The method of claim 20, wherein using a fundamental root of trust further includes using a trust chain that is traceable to a fundamental root of trust through the use of at least one digital certificate associated with the owner.

* * * * *